Feb. 2, 1954
F. A. KRÖGER ET AL  
THALLIUM ACTIVATED CALCIUM PHOSPHATE PHOSPHOR CONTAINING ALUMINUM  
Filed Nov. 7, 1951
2,668,148
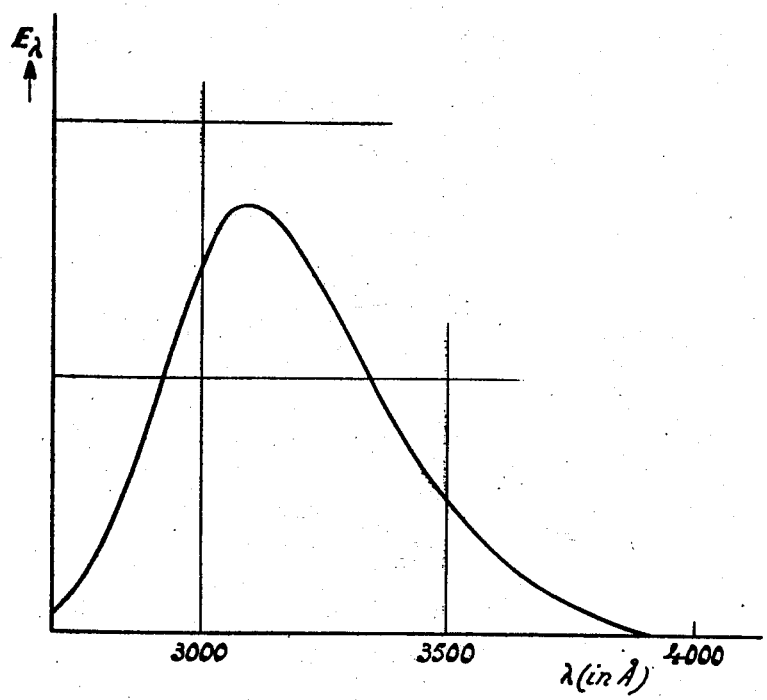
INVENTORS  
Ferdinand Anne Kröger  
Jan van den Boomgaard  
By  
Agent Patented Feb. 2, 1954

2,668,148

UNITED STATES PATENT OFFICE 2,668,148

THALLIUM ACTIVATED CALCIUM PHOSPHATE PHOSPHOR CONTAINING ALUMINUM

Ferdinand Anne Kröger and Jan van den Boomgaard, Eindhoven, Netherlands, assignors to Hartford National Bank and Trust Company, Hartford, Conn., as trustee Application November 7, 1951, Serial No. 255,288

Claims priority, application Netherlands December 19, 1950

4 Claims. (Cl. 252—301.4)

The invention relates to luminescent substances comprising a calcium-phosphate which is activated by thallium. The invention furthermore relates to a source of rays constituted by the combination of an electric gas discharge tube and such a luminescent substance.

Luminescent material has already been described which comprises alkaline earth phosphate activated by thallium. When irradiated by short-wave ultra-violet rays (for example of 2537 Å), such a material has an emission lying between 2900 and 3700 Å, the maximum being at about 3350 Å. Substantially no visible rays are emitted by such a substance. It is therefore particularly suitable for use in sources of rays which have to emit the erythemal part of the spectrum.

It is known that the maximum sensitivity for the erythemal rays lies at about 2967 Å. Consequently the known substances described above have a maximum emission which deviates rather considerably from the maximum erythemal sensitivity, so that the effect of a source of rays comprising these substances is comparatively small. A luminescent substance according to the invention more satisfactorily fulfils the requirement that the two maxima should coincide as far as possible.

A luminescent substance according to the invention comprises calcium-orthophosphate, which is activated by thallium and which has aluminium in the crystal lattice and in which the ratio between the sum of the elements calcium, aluminium and thallium and the supply of phosphorus is between 3:2 and 2.4:2, whilst furthermore the ratio between the supplies of aluminium and thallium lies between 0.5:1 and 2:1.

Excellent results are obtained, if the first-mentioned ratio is chosen to be 2.9:2.

The maximum emission of a substance according to the invention lies between 3050 and 3100 Å. The addition of aluminium in the aforesaid ratio produces this shift of the maximum emission towards the maximum erythemal sensitiveness.

The supplies of aluminium and thallium used are preferably equal, for example 4 atoms per 100 molecules of calcium orthophosphate.

The drawing shows an emission curve of a luminescent substance having the composition of $Ca_3(PO_4)_2$ and equal supplies of aluminium and thallium in a ratio of $(Ca+Al+Tl):P=2.9:2$.

The following two examples serve to explain the method by which a substance according to the invention may be produced.

Example 1

28 gram mol. $CaCO_3$ is mixed with 20 gram mol. $(NH_4)_2HPO_4$ and moistened with 400 cc. of an aqueous solution containing 1 gram mol. $TlNO_3$ per litre and with 400 cc. of an aqueous solution containing 1 gram mol. of $Al(NO_3)_3$ per mitre. After evaporation of the suspension to dryness, the substances are mixed thoroughly; then the dry material is heated in air for one hour at a temperature of from 500 to 600° C. Then the temperature is slowly raised to 1100° C. and maintained for one hour. After cooling and, if necessary, grinding and shifting, the substance is ready for use.

Example 2

To 28 litres of an aqueous solution of $Ca(NO_3)_2$, containing 1 gram mol. per litre, is added 20 litres of an aqueous solution $(NH_4)_2HPO_4$, containing 1 gram mol. per litre, 400 cc. of an aqueous solution of 1 gram mol. of $Al(NO_3)_3$ per litre and 400 cc. of a solution of $TlNO_3$ in water, containing also 1 gram mol. per litre. The liquid is evaporated to dryness and the dry material is thoroughly mixed. The dry product thus obtained is preheated for one hour to a temperature of about 600° C. in air. After slowly raising the temperature to 1100° C., the product obtained is heated at this temperature for one hour. After cooling, and, if necessary, grinding and sifting, the substance is ready for use.

A substance according to the invention may be used in a normal manner in conjunction with a gas discharge tube, producing short-wave ultra-violet rays. If the luminescent substance is housed in the vessel, for example, the glass bulb in which these short-wave ultra-violet rays are produced, care must, of course, be taken that the rays emitted by the luminescent substance are permitted to pass through the wall of the discharge vessel. If the luminescent substance is arranged, on the contrary, outside the discharge vessel in which the short-wave ultra-violet rays are produced, care must be taken that these rays are allowed to pass through the wall of the discharge vessel and to excite the luminescent substance, which is, for example, arranged on a reflector outside the discharge vessel.

What we claim is:

1. Luminescent material consisting of calcium-orthophosphate which is activated by thallium, said material having a crystal lattice comprising aluminium, the ratio between the sum of the elements calcium, aluminium and thallium and the supply of phosphorus being between 3:2 and 2.4:2, the ratio between aluminium and thallium being between 0.5:1 and 2:1.

2. Luminescent material as claimed in claim 1, in which the ratio between the sum of calcium, aluminium and a thallium and phosphorus is equal to 2.9:2.

3. Luminescent material as claimed in claim 1, in which the aluminium content is equal to the thallium content.

4. Luminescent material as claimed in claim 1, in which the aluminium and thallium contents are each 4 atoms per 100 molecules of calcium-orthophosphate.

FERDINAND ANNE KRÖGER.
JAN van den BOOMGAARD.

References Cited in the file of this patent
UNITED STATES PATENTS

| Number | Name | Date |
| --- | --- | --- |
| 2,447,210 | Roberts | Aug. 17, 1948 |
| 2,563,900 | Wollentin | Aug. 14, 1951 |
| 2,563,901 | Nagy | Aug. 14, 1951 |